United States Patent [19]

Baumann et al.

[11] Patent Number: 5,084,163
[45] Date of Patent: Jan. 28, 1992

[54] AUTOMATICALLY CONTROLLED SPLASH PLATE

[75] Inventors: Thomas L. Baumann; Ronald L. Edwards, both of Wausau, Wis.

[73] Assignee: Zimpro Passavant Environmental Systems, Inc., Rothschild, Wis.

[21] Appl. No.: 612,291

[22] Filed: Nov. 13, 1990

[51] Int. Cl.$^5$ .............. B01D 24/40; B01D 37/00
[52] U.S. Cl. .................. 210/744; 210/793; 210/794; 210/275; 210/291
[58] Field of Search .............. 210/744, 793–795, 210/275–279, 289, 291

[56] References Cited

U.S. PATENT DOCUMENTS

| Re. 28,458 | 7/1975 | Ross | 210/80 |
|---|---|---|---|
| 3,459,302 | 8/1969 | Ross | 210/80 |
| 3,516,930 | 6/1970 | Ross | 210/32 |
| 3,587,861 | 6/1971 | Ross | 210/277 |
| 3,817,378 | 6/1974 | Ross | 210/80 |
| 3,933,641 | 1/1976 | Hadden et al. | 210/205 |
| 4,076,625 | 2/1978 | Scholten et al. | 210/274 |
| 4,366,058 | 12/1982 | Wolde-Michael | 210/519 |
| 4,627,923 | 12/1986 | Ross | 210/744 |
| 4,983,308 | 1/1991 | Edwards | 210/794 |

Primary Examiner—Ivars Cintins
Attorney, Agent, or Firm—Tipton L. Randall

[57] ABSTRACT

An improved apparatus and process for the operation of a down-flow granular medium bed filter is disclosed. A splash plate for dissipating the force of influent liquid is rotatably connected to support means, allowing the plate to rotate from a position parallel to the bed surface to a position perpendicular to the bed surface upon the liquid above the bed rising to a selected first level. The splash plate is maintained in the perpendicular position for the remainder of the filtration cycle, the backwash cycle and any chemical cleaning cycle, allowing unobstructed operation of the filter bed. The splash plate returns to the original position at the start of another filtration cycle.

13 Claims, 8 Drawing Sheets

AUTOMATICALLY CONTROLLED SPLASH PLATE

BACKGROUND OF THE INVENTION

1. Field of the Invention

This invention relates to an improved apparatus and process used in the operation of down-flow granular medium bed filters.

2. Information Disclosure Statement

Down flow granular medium bed filters rely on a bed of granular material to filter solids from a waste liquid. The bed, of course, must maintain its integrity during filtration to prevent solids from passing through the filter. Commonly, a facility practicing granular medium filtration will employ a number of filter cells in its design. Each filter cell can operate independently of the other cells which allows one or more cells to be backwashed or receive servicing while the remaining cells continue to filter waste liquid.

Each filter cell receives waste liquid through an inlet. Most commonly an inlet trough, located centrally within a cell and a short distance above the filter bed, distributes influent liquid over the bed within the cell. The U-shaped influent trough generally has sides 12 to 18 inches high and influent liquid overflows the trough onto the filter bed. To prevent the influent liquid from disturbing the granular medium bed, splash plates are positioned a short distance above the bed to dissipate the force of the falling influent from the top of the trough. For a centrally located rectangular trough within a filter cell, a rectangular splash plate is positioned on each side to intercept influent trough overflow and dissipate the force of the falling liquid. The splash plates are normally fastened to support means to secure them in place and render the plates stationary. The plates are generally made of aluminum or fiber glass reinforced plastic to avoid corrosion problems. Some filter cells may be configured with the inlet trough located at one side of the cell such that influent liquid overflows only one side of the trough onto a single splash plate. Other cells may have a simple pipe inlet which directs influent onto a splash plate, although this configuration is less common.

In U.S. Pat. Nos. 3,459,302, Re. 28,458, 3,516,930, 3,587,861 and 3,817,378 Ross discloses an influent trough with stationary splash plates on either side to dissipate energy from the liquid overflowing the trough. Ross also discloses in U.S. Pat. No. 4,627,923 a hollow rectangular pipe which acts as a splash plate for influent liquid overflowing the inlet trough. Also disclosed is the mixing of oxidizing agent and surfactant within the filter bed by introducing each substance by separate conduit systems below and within the filter bed.

Hadden et al. in U.S. Pat. No. 3,933,641 employ a splash pan with a trough, baffles and holes to distribute effluent over the surface of an underlying filter bed. The splash pan is supported above the filter by brackets on the filter walls and the pan covers the whole surface of the filter tank for evenly distributing effluent over the whole surface of the filter bed.

Scholten et al. in U.S. Pat. No. 4,076,625 disclose a granular-media filter with wash trough and baffle assembly to reduce media loss during high-turbulence washing of the media. The baffle is described as having an upwardly concave arcuate portion in opposed relation to the trough lower portion, and defining a restricted flow channel for wash water to the trough.

In U.S. Pat. No. 4,366,058 Wolde-Michael discloses a multicompartmented settling tank with a variously adjustable solid plate which is normally inclined at a 45° angle. The plate controls fluid flow rate and also acts as a floating material trap along its lower portion and as a settling area for fine particulate matter at its upper portion.

The inlet trough of a granular medium bed filter may also function as a collector for the removal of backwash liquid and the solids flushed from the bed during backwashing. In the backwashing cycle, liquid flows up through the bed, carrying filtered particles with it into the trough and out of the filter cell to further treatment or disposal.

The inlet/backwash trough and splash plates can cover a significant portion of the filter bed surface and this may impede filtration, backwashing or chemical cleaning of the filter cell. The splash plates may shield the portion of the filter bed directly below them from receiving an even distribution of particulates from the influent liquid. During backwashing, the splash plates may interfere with the scouring action of the granular medium which helps clean the medium. Likewise, when an air outlet below the liquid surface is used to creates currents in the liquid above the filter bed and sweep particles into the trough during backwashing, the splash plates may interfere with the circulation currents which carry particles into the trough. Addition of cleaning chemicals to the filter bed from above is also impeded by the splash plates which shield that portion of the bed directly below the plates from the cleaner. Therefore, we have devised a splash plate configuration which overcomes all of these drawbacks discussed above.

SUMMARY OF THE INVENTION

This invention provides an apparatus and method for protecting the integrity of a granular medium filter bed during a filtration run while also providing for improved utilization of the granular medium bed during filtration, and unobstructed operation during backwashing and chemical cleaning cycles.

The apparatus comprises a splash plate, supported from below in a generally parallel position relative to the filter bed surface by support means, said plate intercepts liquid from the influent trough to maintain the integrity of the granular medium filter bed during filtration with low liquid levels above the filter bed. The splash plate is pivotally connected to the support means at one side adjacent to the inlet trough. A lifting means connected to the opposite side of the splash plate pivots the plate from the parallel position to a generally perpendicular position relative to the filter bed surface as liquid rises to a preselected first level above the bed surface. In an alternative embodiment the support means is pivotally hinged near the inlet trough and both the splash plate and support means pivot to a generally perpendicular position as liquid rises to a preselected first level above the bed surface. The splash plate is maintained in the perpendicular position during the remainder of the filtration cycle, the backwash cycle and any required chemical cleaning cycle. This orientation allows unobstructed operation of the granular medium of the filter bed during these cycles. The splash plate returns to the parallel position following a backwash cycle or a chemical cleaning cycle, or upon the level of liquid above the filter bed falling below the preselected first level, to intercept influent overflow from the trough.

DESCRIPTION OF THE PREFERRED EMBODIMENTS

Figure 1:
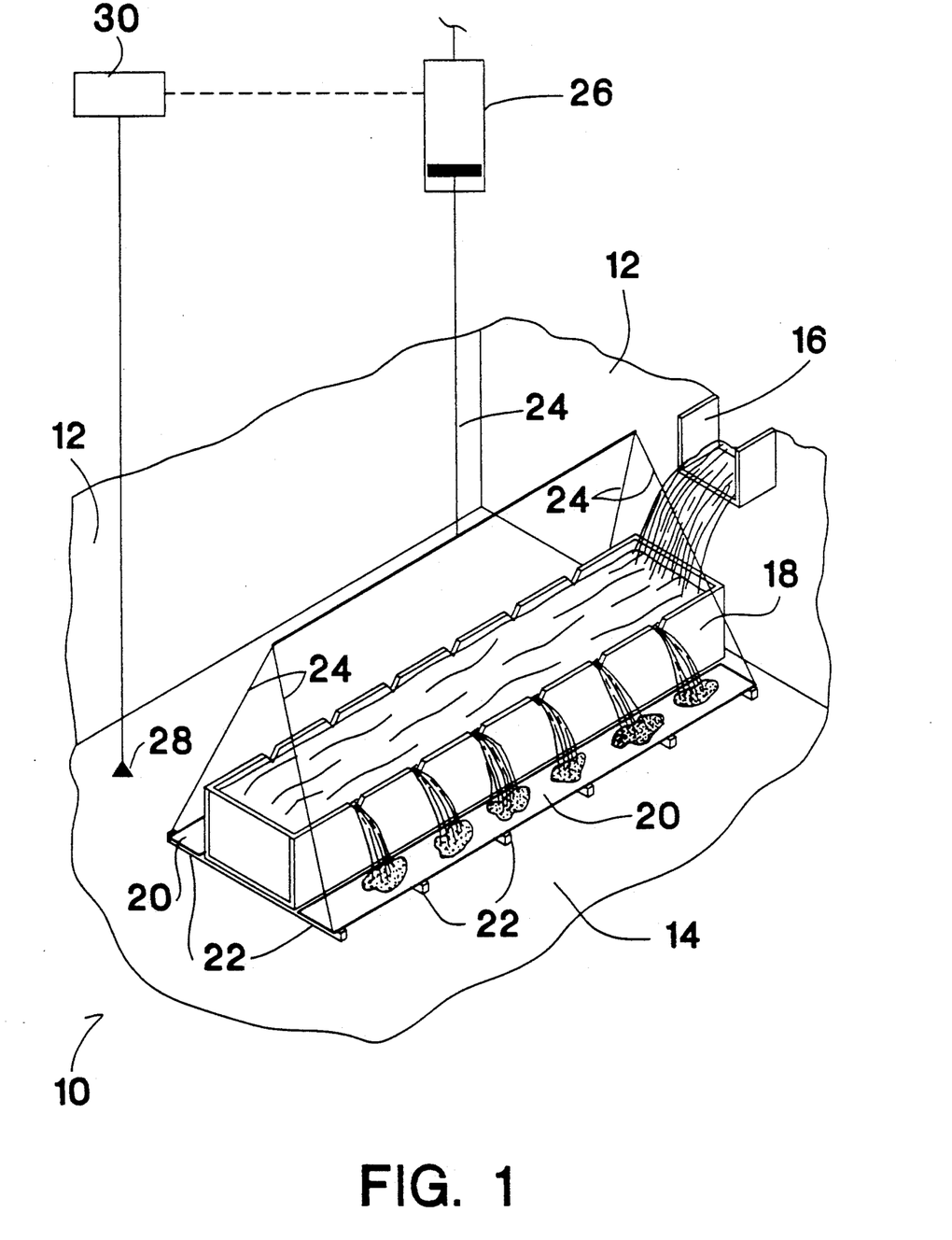
FIG. 1 is a pictorial view of a granular medium filter cell employing one embodiment of the present invention.

Referring to FIG. 1, a granular medium filter cell 10 contains sidewalls 12 and a granular medium bed 14. Liquid influent enters the cell through an inlet weir 16 and flows into a trough 18 located centrally within the filter cell. The trough 18 generally extends across the full width of the filter cell. In smaller cells the trough 18 is supported at the ends by attachment to opposing walls. Larger cells with correspondingly longer troughs may require support at several central points in addition to attachment at the ends. Two or more inlet troughs may be used to distribute influent liquid to very large filter cells.

The influent flow through the inlet weir into the cell is controlled by a valve (not shown). Influent liquid overflows from the trough 18 and onto splash plates 20 located on each side of the trough 18 and a short distance above the surface of the filter bed 14. The splash plates are positioned parallel to the filter bed surface and dissipate the force of the liquid overflowing from the though 18, maintaining the integrity of the filter bed 14. The splash plates 20 are attached or hinged to support structures 22 at a number of points on the edge of the plate nearest to the trough. The hinged edge attachment is such that each splash plate can rotate upwardly from a position essentially parallel to the bed surface to a position essentially perpendicular to the bed surface. This rotational change in position is accomplished by attaching the edge of each plate opposite the hinged edge, by means of cables 24, to a device 26 which raises the cables and thus rotates the plates. Chains, wires, ropes or other suitable connecting means may be used to connect the splash plates 20 to the raising device 26. This raising device may be a piston actuator, a pneumatic piston, a cable winch or other such mechanism. The configuration of splash plates 20 and cables 24 shown in FIG. 1 allows a single raising means to raise the cables 24 connected to the splash plates 20 on each side of the trough 18. The raising device 26 is securely supported from above.

As the level of liquid above the filter bed 14 increases during a filter run, the splash plates 20 are no longer needed to dampen the force of the influent liquid overflowing from the trough 18. The plates may be rotated to a perpendicular position once the liquid reaches a first selected level above the bed. A level switch 28 connected to a controller 30 for the raising device may be used to monitor the liquid level above the filter bed. With the liquid level below the level switch 28, the splash plates are in the parallel position. As liquid rises above the level switch, the controller 30 receives this signal and causes the lifting means to raise the cables, rotating the splash plates to the perpendicular position. Should the level of liquid above the filter bed fall below the level switch 28, such as might occur with a temporary decrease in influent flow, the controller 30 signals the raising means 26 to lower the splash plates to the original parallel position, thus protecting the integrity of the filter bed.

Figure 2:
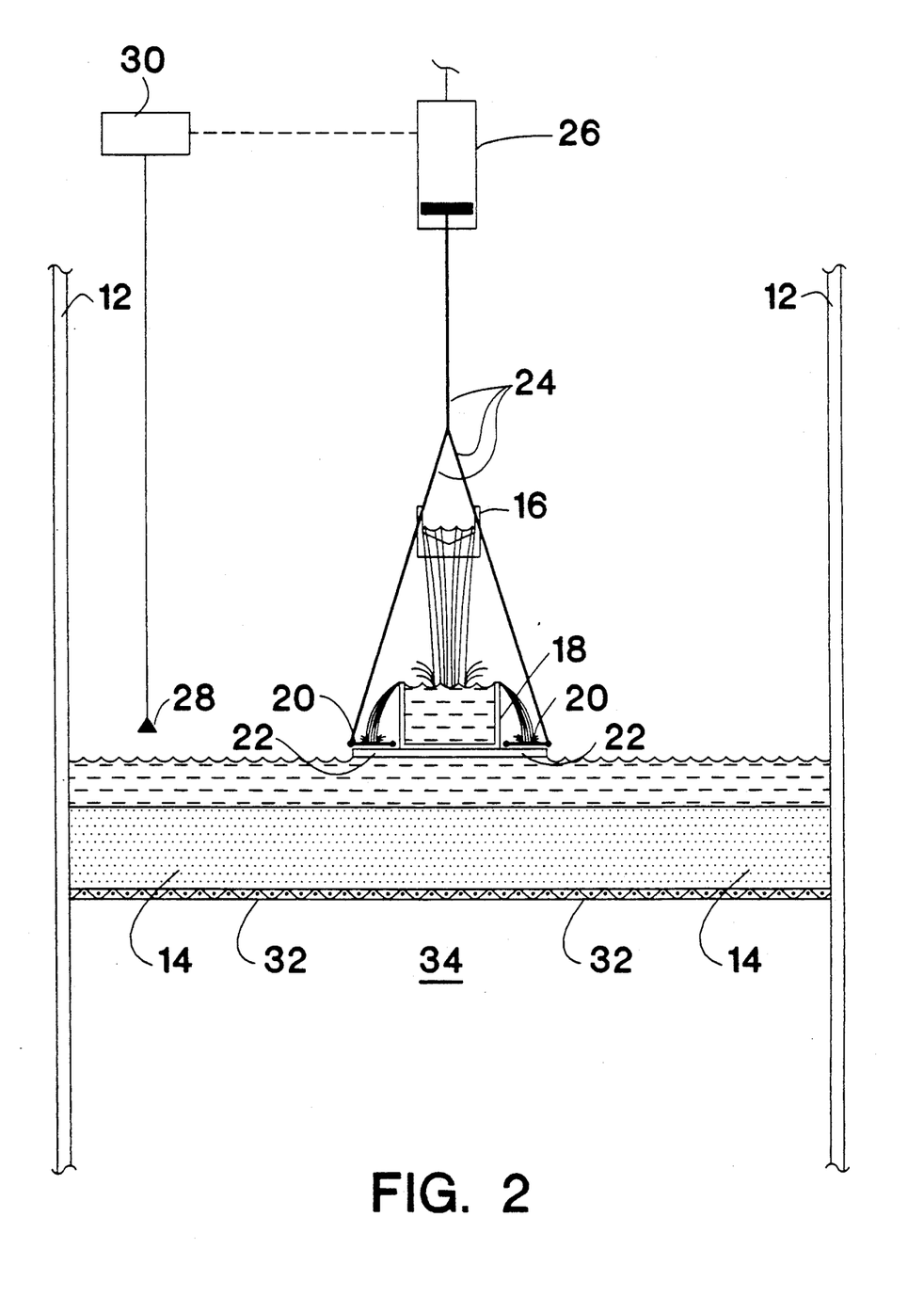
FIG. 2 is a partial cross sectional view of a granular medium filter cell at an early stage of a filtration cycle.
Figure 3:
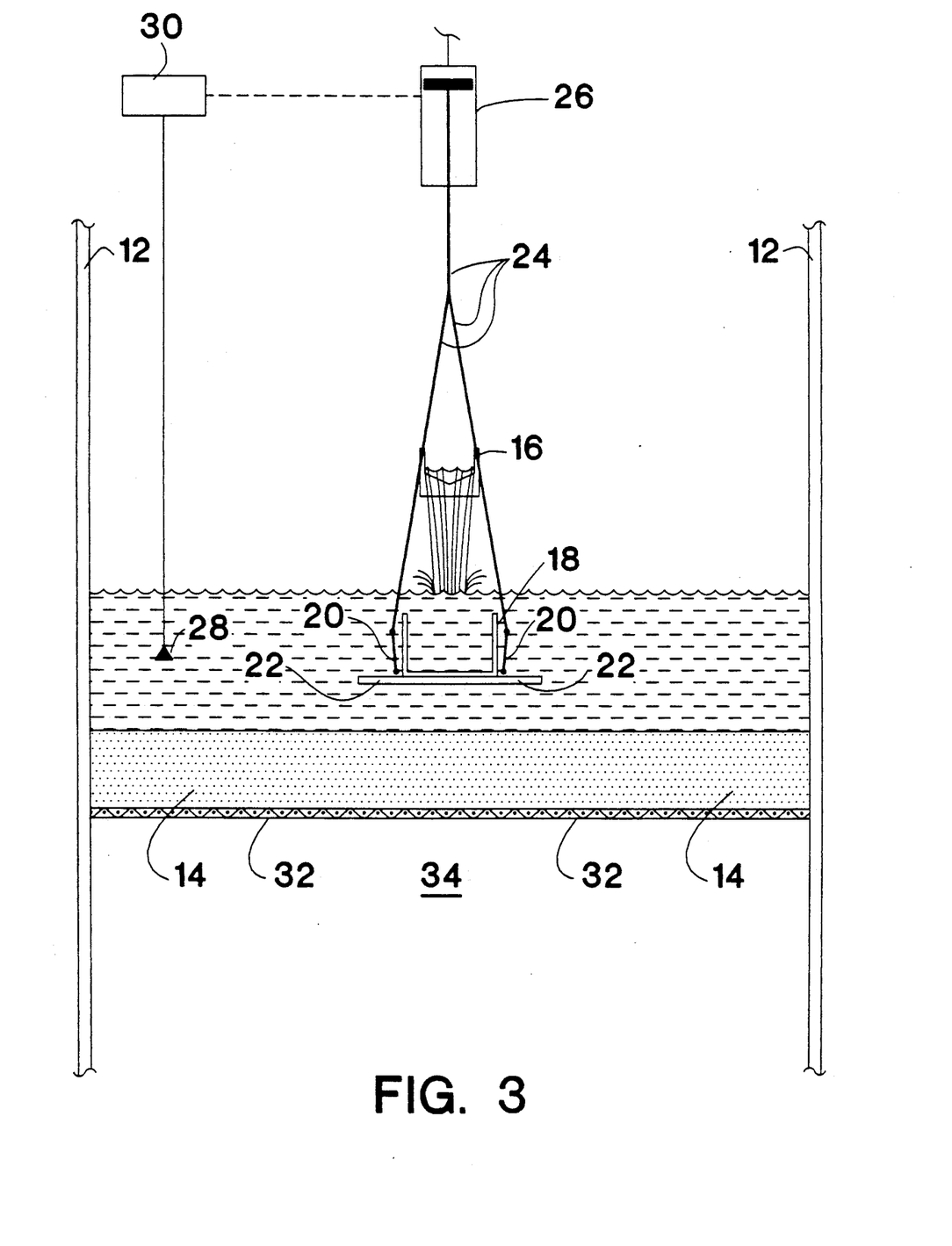
FIG. 3 is a partial cross sectional view of a granular medium filter cell at a later stage of a filtration cycle.

Cross sectional views of the filter cell of FIG. 1 are shown in FIGS. 2 and 3 with the splash plates 20 in the parallel and perpendicular orientations respectively. The filter bed 14 is maintained in position by a bed support 32, such as a screen, which allows filtered liquid to pass from the bed 14 to the filter underdrain cavity 34.

Figure 4:
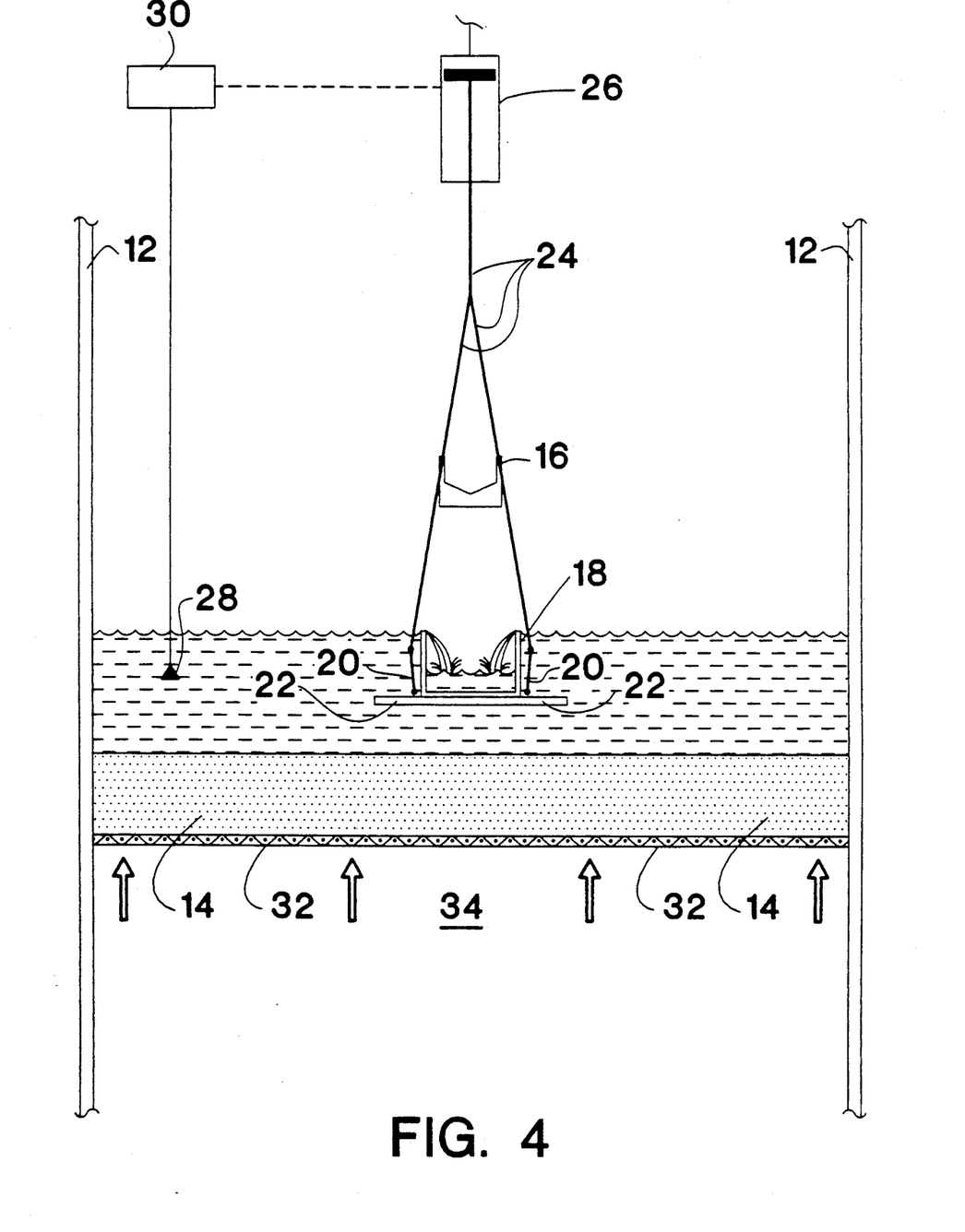
FIG. 4 is a partial cross sectional view of a granular medium filter cell in a backwash cycle.

As more solids collect on the filter bed 14, the liquid level above the bed rises to a second selected level, above the first selected level, initiating a backwash cycle. Influent flow ceases and a valve at one end of the trough 18 opens to drain influent liquid from the trough 18 and to remove backwash liquid from the filter cell which is collected by the trough 18. The splash plates 20 remain perpendicular to the bed surface during the backwashing so not to interfere with the flushing of the portion of the filter bed below the splash plates 20 in their former parallel position. Backwash liquid flows up from the underdrain cavity 34 and carries solids from the filter bed 14 into the trough 18 and out of the filter cell through the valved opening in the end of the trough 18. This operation is depicted in FIG. 4 in a cross sectional view.

Figure 5:
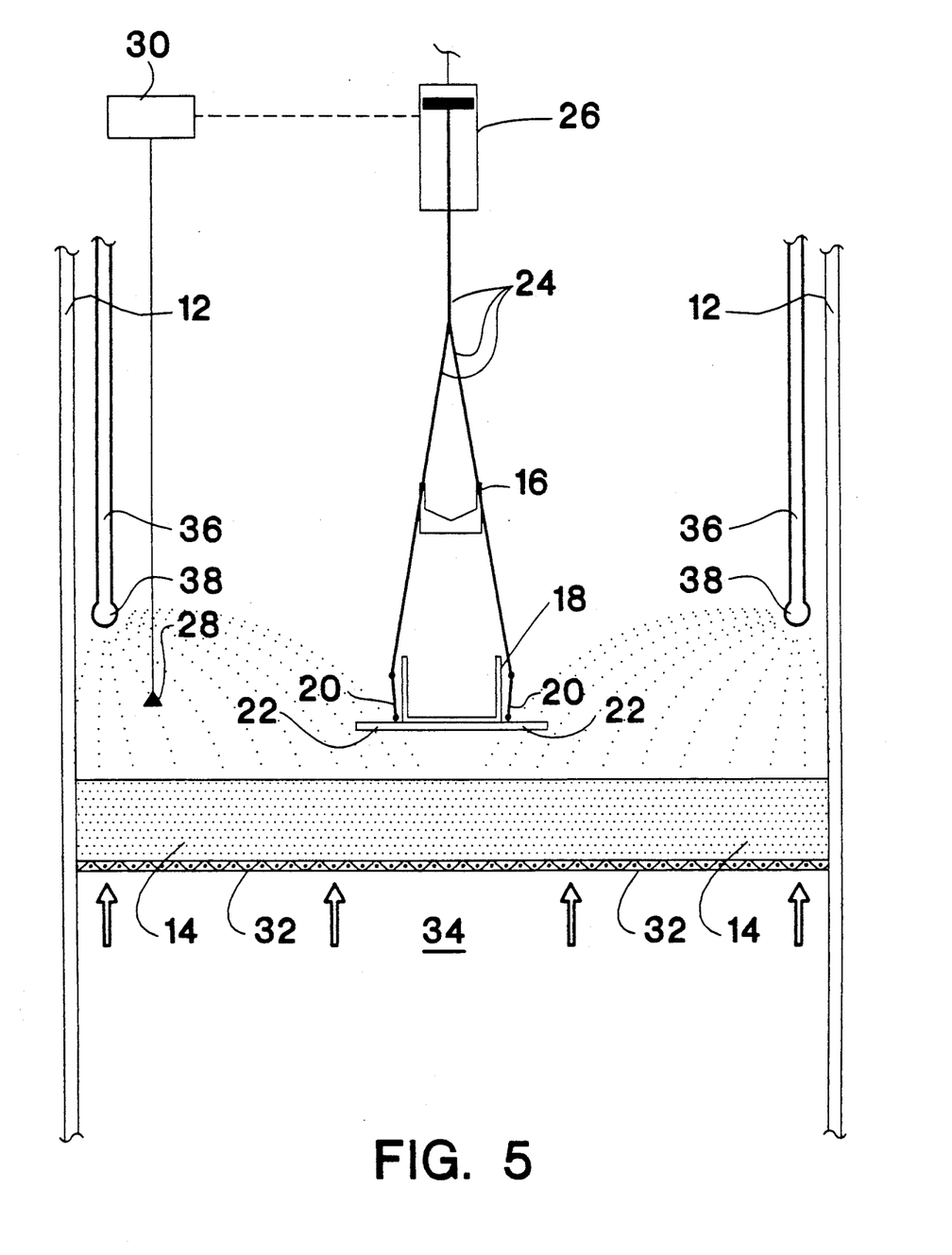
FIG. 5 is a partial cross sectional view of a granular medium filter cell receiving chemical cleaner bed surface spray from chemical cleaner nozzles.

As the granular medium in the filter cell becomes dirty, cleaning with chemical agents is required to restore the performance of the filter cell. The surface of the filter bed may become crusty with grease and dirt and require special treatment. A chemical cleaning cycle may be initiated after a specified number of backwash cycles or may be initiated manually by the filter operator. The chemical cleaning cycle is usually performed following a backwashing cycle, commencing with allowing all backwash liquid to drain from the filter cell. This cleaning cycle involves spraying chemical cleaner on the exposed bed surface from above the bed as well as forcing chemical cleaner up through the bed from the underdrain cavity 34. With the splash plates 20 rotated to a position perpendicular to the bed surface, the area below each plate is accessible for chemical spray and cleaning. This chemical cleaning cycle is shown in FIG. 5 with the cleaning agent supplied by conduits 36 to spray nozzles 38 positioned to deliver cleaning agent over the surface of the filter bed 14. A pump (not shown) forces cleaner up from the underdrain cavity 34 as well.

Figure 6:
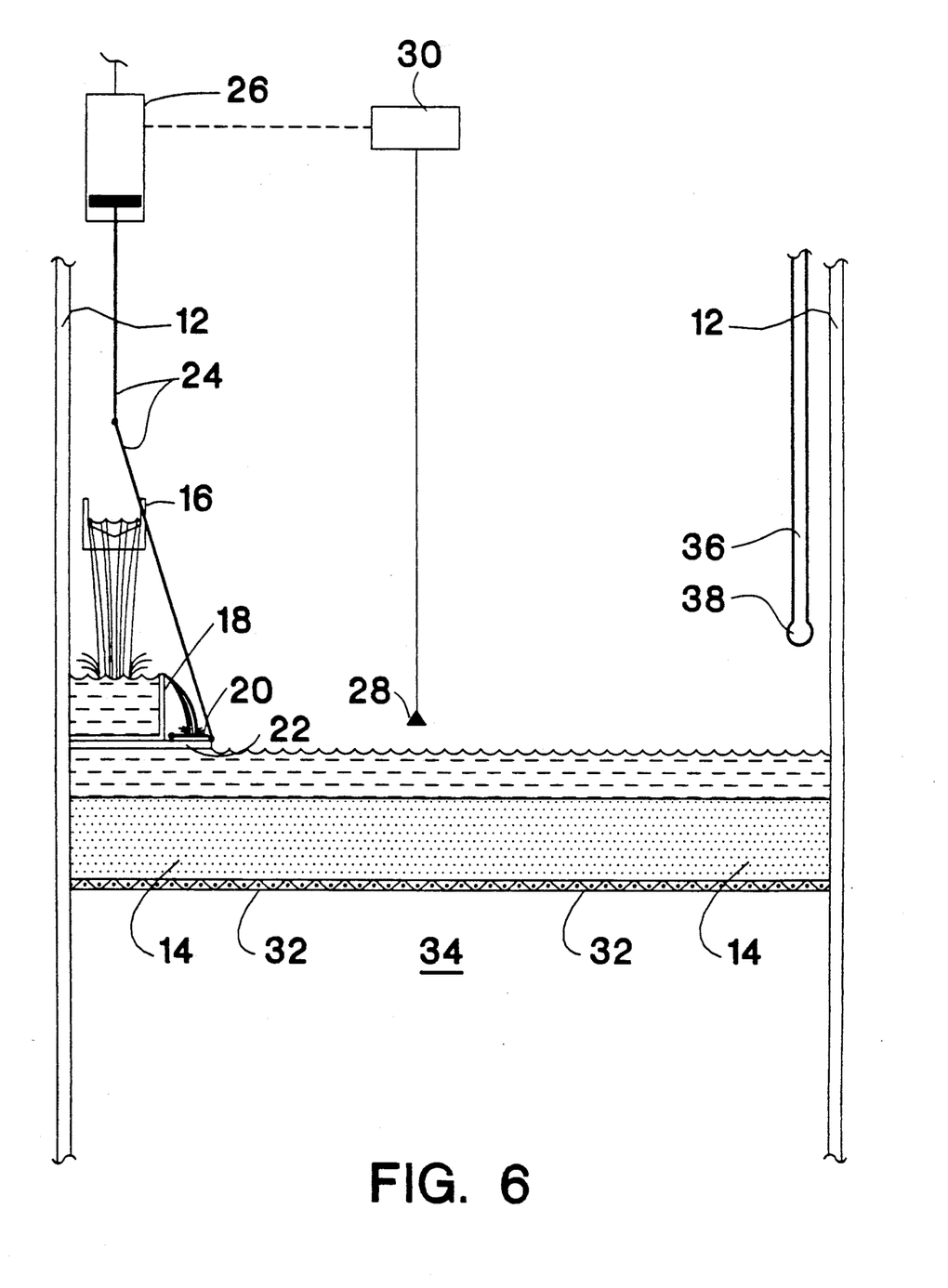
FIG. 6 is a partial cross sectional view of a granular medium filter cell with an alternate configuration of inlet trough and splash plate of the present invention.

Another variation in the configuration of the trough and splash plate within a filter cell is shown in FIG. 6. In this variation the inlet trough 18 is located at one side of the filter cell with influent liquid overflowing one side of the trough onto a single splash plate 20 as shown in FIG. 6. The splash plate 20 is connected to raising means 26 by a cable 24 which allows the plate to rotate from an essentially horizontal position to an essentially vertical position relative to the filter bed surface.

Alternative rotating means for the splash plates include fastening the side of the plate nearest the trough to a shaft which rotates 90 degrees to raise the plate to a perpendicular position. Alternatively, a pneumatic cylinder connected to each plate and to the trough or filter wall would, depending upon location of the cylinder, push or pull the splash plate to the perpendicular position when required. The pneumatic cylinder would require submerged operation. The use of an overhead piston or winch device with cable attached to the splash plate is the preferred embodiment for the lifting means.

Figure 7:
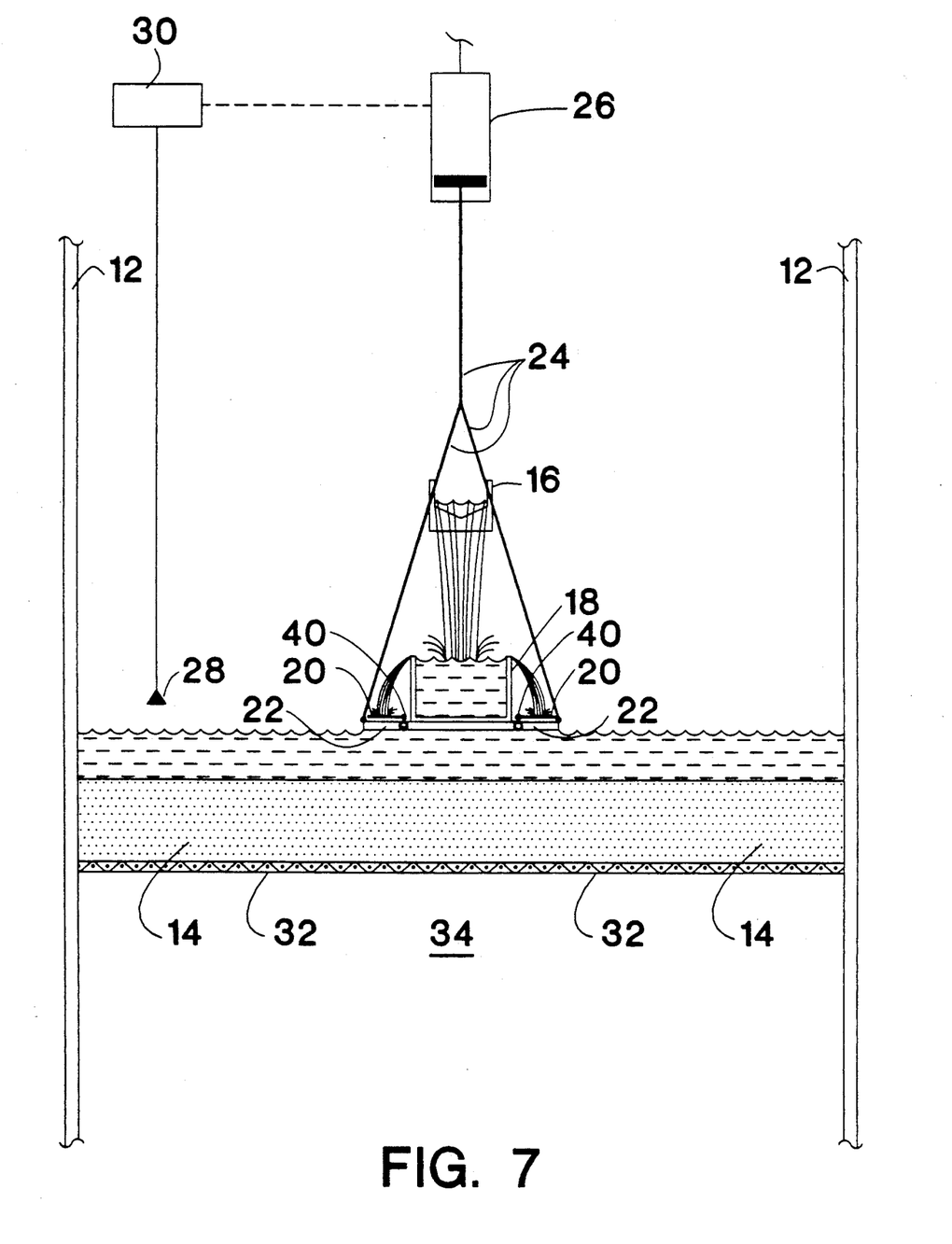
FIG. 7 is a partial cross sectional view of a granular medium filter cell employing an alternative embodiment of the present invention.
Figure 8:
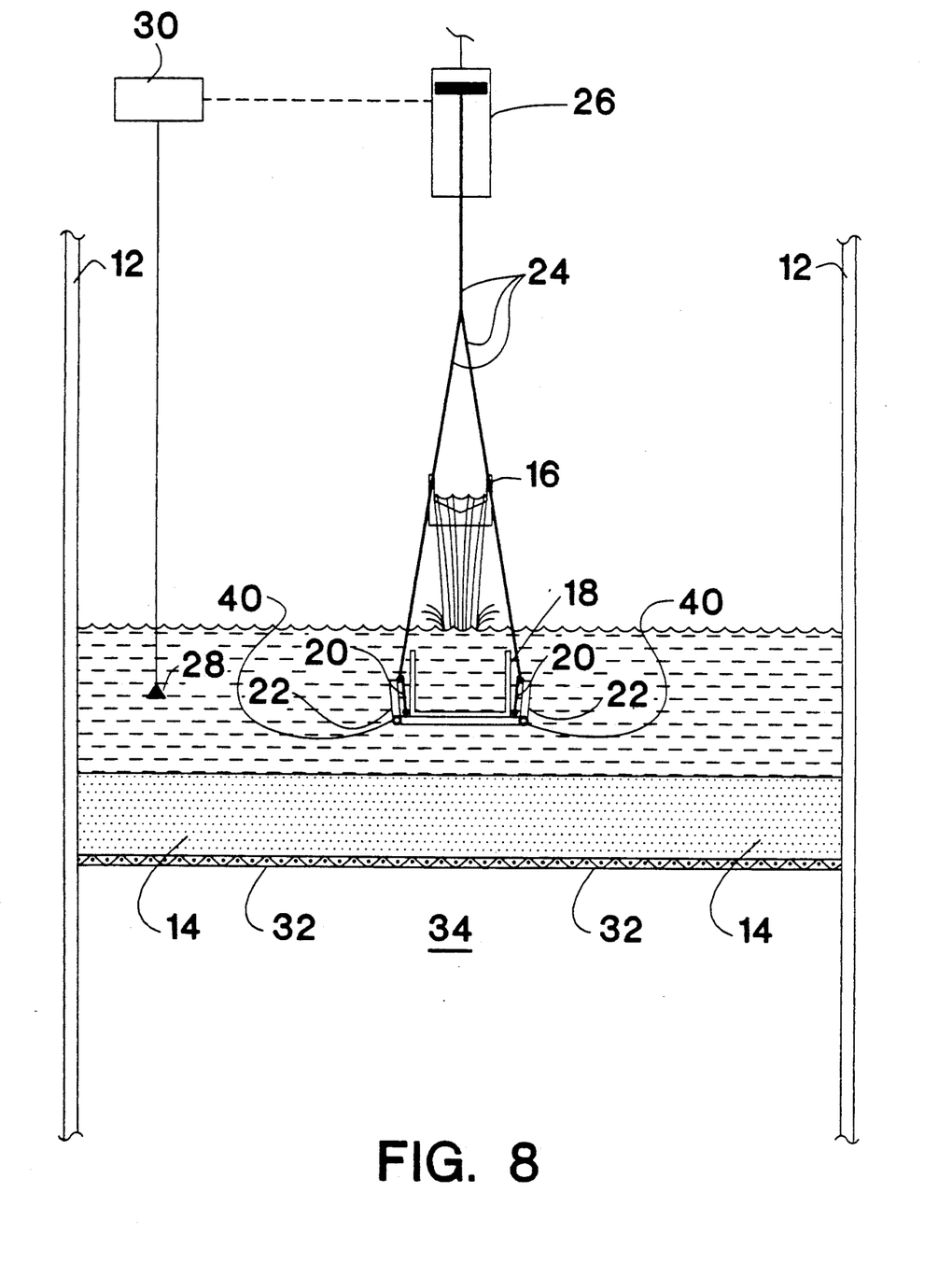
FIG. 8 is also a partial cross sectional view of a granular medium filter cell employing an alternative embodiment of the present invention.

In an alternative embodiment shown in FIGS. 7 and 8, the splash plates 20 are securely attached to the support means 22 with the support means rotatably hinged near the trough by hinges 40. The cable 24 is connected to the outer edge of the splash plates 20 or the end of the support means 22 further from the trough. Raising the cable rotates both the splash plates and the hinged support means to a position with the splash plates perpendicular to the filter bed surface. Only those support means attached to the cable 24 need be hinged to allow rotation of the splash plates 20. The unattached support means may remain stationary, as described in FIGS. 1-6, since the splash plates simply rests unattached atop these non-hinged support means.

From the foregoing description, one skilled in the art can easily ascertain the essential characteristics of the invention and, without departing from the spirit and scope thereof, make various changes and modifications to adapt it to various usages.

We claim:

1. In a down-flow granular medium bed filter with influent delivery trough having first and second trough sides, said trough positioned above said filter bed for distribution of influent liquid over said filter bed surface, an apparatus for protecting said bed from disruption by influent liquid during filtration while also providing for improved utilization of said granular medium bed during filtration, and unobstructed operation during backwashing and chemical cleaning cycles comprising;
   a) a splash plate supported from below by support means, said plate positioned in a generally parallel position relative to said filter bed surface, said splash plate positioned to intercept influent liquid overflowing from said influent trough, said plate pivotally connected to said support means at one side adjacent said trough; and
   b) lifting means connected to the splash plate at another side opposite said trough, for pivoting said splash plate from said generally parallel position to a generally perpendicular position relative to said filter bed surface to allow unobstructed operation of said granular medium filter during filtration, backwashing and chemical cleaning cycles.

2. An apparatus according to claim 1 wherein said first side of said inlet trough is located against a side of a filter cell and said splash plate is positioned to dissipate influent liquid overflowing from said second side, opposite the first side, of said trough.

3. An apparatus according to claim 1 wherein said inlet trough is located centrally within a filter cell and a plurality of splash plates are positioned to dissipate influent liquid overflowing from said first and second sides of said trough.

4. An apparatus according to claim 1 wherein said lifting means comprises a piston actuator with cable connected to the splash plate side opposite the inlet trough for raising said plate to a generally perpendicular position relative to said filter bed surface.

5. An apparatus according to claim 1 wherein said lifting means comprises a pneumatic cylinder connected to the splash plate side opposite the inlet trough for raising said plate to a generally perpendicular position relative to said filter bed surface.

6. In a down-flow granular medium bed filter with influent delivery trough having first and second trough sides, said trough positioned above said filter bed for distribution of influent liquid over said filter bed surface, an apparatus for protecting said bed from disruption by influent liquid during filtration while also providing for improved utilization of said granular medium bed during filtration, and unobstructed operation during backwashing and chemical cleaning cycles comprising;
   a) a splash plate and support means assembly, said splash plate supported from below by support means and positioned in a generally parallel position relative to said filter bed surface, said splash plate positioned to intercept influent liquid overflowing from said influent trough, said splash plate and support means assembly pivotally hinged at one side adjacent said trough; and
   b) lifting means connected to the splash plate and support means assembly at another side opposite said trough, for pivoting said splash plate and support means assembly from said generally parallel position to a generally perpendicular position relative to said filter bed surface to allow unobstructed operation of said granular medium filter during filtration, backwashing and chemical cleaning cycles.

7. An apparatus according to claim 6 wherein said first side of said inlet trough is located against a side of a filter cell and said splash plate and support means assembly is positioned to dissipate influent liquid overflowing from said second side, opposite the first side, of said trough.

8. An apparatus according to claim 6 wherein said inlet trough is located centrally within a filter cell and a plurality of splash plate and support means assembly are positioned to dissipate influent liquid overflowing from said first and second sides of said trough.

9. An apparatus according to claim 6 wherein said lifting means comprises a piston actuator with cable connected to the splash plate and support assembly side opposite the inlet trough for raising said assembly to a generally perpendicular position relative to said filter bed surface.

10. An apparatus according to claim 6 wherein said lifting means comprises a pneumatic cylinder connected to the splash plate and support means assembly side opposite the inlet trough for raising said assembly to a generally perpendicular position relative to said filter bed surface.

11. A process for operating a down-flow granular medium bed filter with influent delivery trough positioned above said filter bed for distribution of influent liquid over said filter bed surface, said process protecting said bed from disruption by influent liquid during filtration while also providing for improved utilization of said granular medium bed during filtration, and unobstructed operation during backwashing and chemical cleaning cycles ocmprising the steps;
  a) flowing influent liquid into said trough and overflowing said influent onto a filter splash plate positioned generally parallel to said filter bed surface and then to said filter bed, until liquid level above said filter bed surface rises to a first selected level thereabove;
  b) rotating said filter splash plate about a pivot axes by lifting means to a position generally perpendicular to said filter bed surface while continuing to add influent liquid for downward flow filtration, the liquid above the filter bed surface dissipating energy of influent trough overflow and maintaining the integrity of the filter bed;
  c) backwashing the filter bed with filtrate upon the level of liquid above the filter bed surface rising to a second selected level, greater than said first selected level, said splash plate remaining in said generally perpendicular position during said backwashing step; and
  d) rotating said splash plate about said pivot axes by said lifting means to said generally parallel position relative to said filter bed surface and commencing another filtration cycle.

12. A process according to claim 11 further comprising the steps of draining said backwashing liquid from above said filter bed to expose the bed surface and cleaning the filter bed by chemical addition to the filter bed with the splash plate in said generally perpendicular position following said backwashing step c.

13. A process according to claim 11 further comprising the step of rotating said filter splash plate to a generally parallel position upon the liquid level above the filter bed surface falling below said selected first level prior to said backwashing step c.

* * * * *

UNITED STATES PATENT AND TRADEMARK OFFICE
CERTIFICATE OF CORRECTION

PATENT NO. : 5,084,163
DATED : January 28, 1992
INVENTOR(S) : Thomas L. Baumann et al.

It is certified that error appears in the above—identified patent and that said Letters Patent is hereby corrected as shown below:

In claim 11, column 7, line 3, "ocmprising" should read
--comprising--.

Signed and Sealed this

Sixth Day of April, 1993

Attest:

STEPHEN G. KUNIN

*Attesting Officer*   Acting Commissioner of Patents and Trademarks